United States Patent [19]

Woodworth et al.

[11] 3,764,923

[45] Oct. 9, 1973

[54] AUTOMATIC PULSE LEVEL CONTROL

[75] Inventors: William H. Woodworth, China Lake; Marc L. Moulton, Ridgecrest; James H. Whittington, China Lake, all of Calif.

[73] Assignee: The United States of America as represented by the Secretary of the Navy, Washington, D.C.

[22] Filed: Mar. 22, 1972

[21] Appl. No.: 237,163

[52] U.S. Cl...... 328/175, 178/7.5 DC, 178/DIG. 29, 307/264, 328/168, 330/29

[51] Int. Cl........................... H03k 5/08, H03b 3/02

[58] Field of Search.................... 328/168, 173, 175; 330/29; 307/264; 178/7.5 DC, DIG. 29

[56] References Cited

UNITED STATES PATENTS

| | | | |
|---|---|---|---|
| 3,206,689 | 9/1965 | Santana | 328/173 |
| 3,309,615 | 3/1967 | Baldwin et al. | 328/173 X |
| 3,339,018 | 8/1967 | Brown | 328/173 X |

*Primary Examiner*—John Zazworsky
*Attorney*—R. S. Sciascia et al.

[57] ABSTRACT

A pulse level control which detects the maximum video level change (contrast) present during the gate interval and designates this as the desired target so that the target may be sorted from the background present in the tracking gate. The control provides a constant pulse level output for a varying input level, which is accomplished by the use of digital circuitry in the pulse stretching portion of the control loop.

7 Claims, 2 Drawing Figures

AUTOMATIC PULSE LEVEL CONTROL

BACKGROUND OF THE INVENTION

In the field of electronic pulse controls, previous pulse level controls operable in the video frequency range are non digital, linear circuits. A pulse level control is one which accepts an input of variable height pulses and provides an output having a constant amplitude. The previous linear circuits have an excessively slow response time and unequal increasing-decreasing response rates because of the limitations of linear sample and hold circuits for very short sample to hold ratios. The previous circuits are subject to small but significant shifts during their sensing interval.

The present invention has a quicker response time, stable dynamic response, and equal increasing-decreasing response rates. The digital circuit of the present invention, additionally, eliminates the small shifts which occur during the sensing interval of the prior devices.

SUMMARY OF THE INVENTION

A pulse level control which provides a constant pulse level output for a varying input pulse level. The constant pulse level output is maintained by the use of digital circuitry in the pulse stretching portion of a feedback loop. The pulse stretching portion is comprised of four comparators and a flip-flop associated with each comparator. The comparators trip sequentially in incremental voltage levels; and, as each comparator is tripped it sets its associated flip-flop. The flip-flops which are set control the response of the feedback loop.

DESCRIPTION OF THE PREFERRED EMBODIMENT

The present invention is a device for maintaining a preselected pulse level regardless of the level of the input signal. That is, if the input signal level is low the present invention effectively boosts the D.C. value of the signal so that the signal's maximum value falls within a preselected range bound by threshold levels. And, if the input signal level is high the present invention effectively reduces the D.C. value of the signal so that the signal's maximum value falls within the same preselected range. In each case, it is the input signal's highest level which is forced to fall within the range and is selected as the information of interest.

In the preferred embodiment wherein the present invention is used as a target detection circuit, all incoming signals are received, and are evaluated if they occur during the gate period. The circuit senses when the highest level of the input occurring in the gate period fails to remain in the threshold bounded range. If the pulse level has crossed the upper threshold, the circuit adjusts the D.C. level of the signal at point A of FIG. 2 to bring the highest level of the pulses at point B of FIG. 2 within the desired range. And, likewise, if the pulse level has crossed the lower threshold the D.C. level at point A is adjusted to bring the highest level of the input within the desired range. In this way, the present invention maintains its detection level at the highest pulse level occurring during the period of interest for any input. As a result, the preferred embodiment is sensitive to low level target signals as well as high level target signals.

Figure 1:
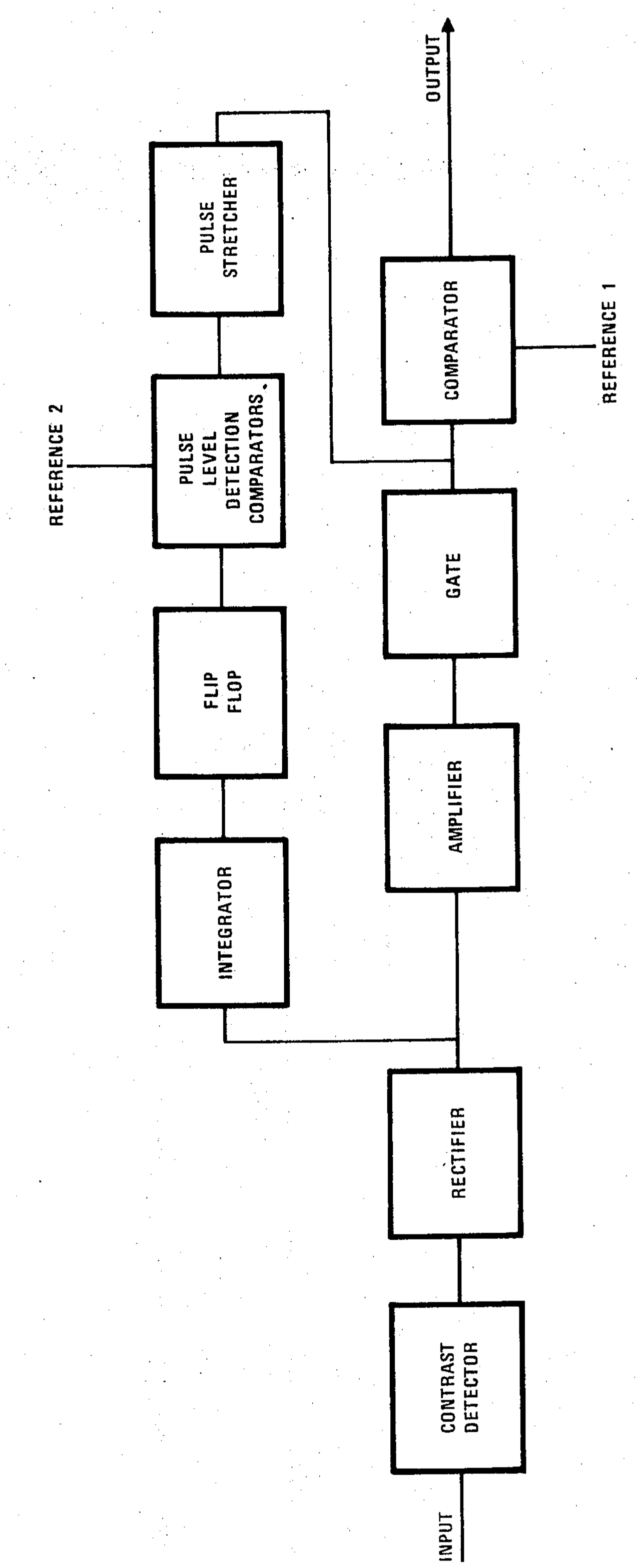
FIG. 1 is a block diagram of the present invention.

A block diagram of the present invention is shown in FIG. 1. The input video is coupled to a Contrast Detector which converts the video level changes to pulses. A Rectifier full-wave rectifies the pulses and provides an output composed of the rectified pulses and a feedback signal, which output is amplified. The output of the Amplifier is fed to a Gate which passes only those pulses occuring during a pre-selected period. The pulses passed are compared to a reference voltage in the Comparator to reject low amplitude noise. The pulses passed by the Gate and Comparator are provided as the video signal output.

A portion of the video signal output is coupled to a high speed Pulse Stretcher in the automatic gain control network. The output of the Pulse Stretcher is coupled to digital pulse Level Detection Comparators which compare the stretched video pulse to a second reference voltage. The digital Comparators trip in sequence at preselected values of pulse level. The outputs of the Comparators are used to set the Flip Flops. And the output of the Flip Flops are integrated by the Integrator which provides the gain control signal to the input of the Amplifier where it is compared with the input video signal.

Figure 2:
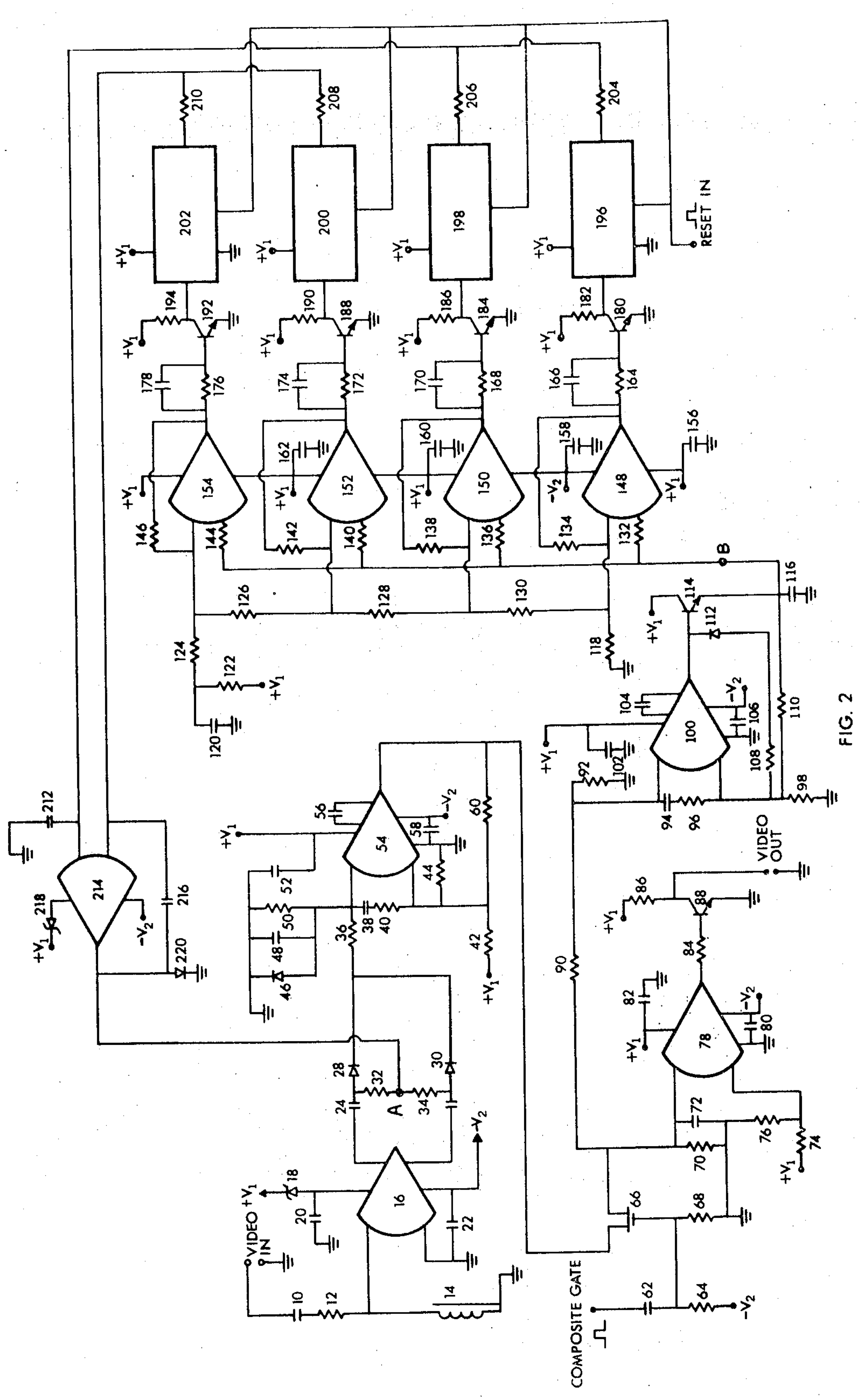
FIG. 2 is a schematic diagram of the preferred embodiment of the present invention.

A schematic diagram of the preferred embodiment of the present invention is shown in FIG. 2. The video signal input, which is probably approximately 1 volt peak-to-peak, is coupled through capacitor 10 and resistor 12 to a contrast detector composed of shorted delay line 14. Contrast detector 14 converts the incoming video level changes to pulses on a 0 volt D.C. base line, equal to the changes in amplitude. The pulses vary in width from, probably, a maximum of one-half microsecond to a minimum which is a function of the incoming video bandwidth.

The pulses from contrast detector 14 are amplified by differential amplifier 16. Each output of amplifier 16 is A.C. coupled through capacitors 24 and 26 into diodes 28 and 30, which limit the total output to positive going pulses. Thereby, the pulses are full-wave rectified.

A feedback signal is coupled between the A.C. coupling, i.e., capacitors 24 and 26, and the diodes, thus limiting the amplitude of the output pulses to the sum of the feedback voltage, the voltage across diodes 28 and 30, and the pulse amplitude from differential amplifier 16.

The amplitude controlled and full-wave rectified pulses are then amplified by wide band operational amplifier 54. The pulses are amplified by a factor of, for example, 5.5. The output of the operational amplifier is limited to, for example, approximately 6 volts by diode 46 which couples the input of the amplifier to ground. The input limiting protects amplifier 54 from being over driven. This amplification stage fits the gain for a minimum video level that will provide a useable output from the circuit. If used in a tracking system the gain is selected so that when there are no targets present in the tracking gate, random noise will not be mistaken for targets on a short time average basis of the output of the circuit. The gain, if properly set, will, however, provide adequate sensitivity for tracking practical targets.

The outputs of wide band operational amplifier 54 is gated by field effect transistor (FET) 66. The FET is switched, i.e., controlled by, the composite gate from the tracker, for example. The composite gate is coupled through capacitor 62 to the gate of FET 66. By this gating, only those pulses which occur during the tracking gate, or any other period which can be used to gate FET 66, are accepted as valid bits of information, or targets.

The gated pulses are then compared in comparator 78 with a reference voltage coupled through resistor 74 to an input of comparator 78. The comparison is used to reject low amplitude noise and provide a constant pulse amplitude output. The amplitude of the output is maintained at a constant once the amplitude for the respective pulse is established by the circuit. That is, the amplitude of each pulse is made to fall within the upper and lower threshold limits and is thereafter maintained by the circuit. As a result, the output of comparator 78 is maintained at a constant pulse amplitude. The output of comparator 78 is coupled through transistor 88, which provides compatability with external equipment, to the video output.

The output of FET is also coupled through resistor 90 to the feedback loop which is used to maintain the pulse amplitude of the output of FET gate 66 at a preselected value, for example 0.5 volts. The pulses gated by FET 66 are fed to a high speed pulse stretcher composed of operational amplifier 100, transistor 114, and capacitor 116. The time constant of the pulse stretcher is selected to insure reliable tripping of comparators 148–154. If the values which are contained in this application are used, the discharge time constant of the pulse stretcher will be approximately 40 microseconds.

Comparators 148–154 are used for pulse level detection. The outputs of comparators 148–154 are level shifted for compatability with flip flops 196–202, and are used to set the flip flops, which are reset by external means such as a 60 cycle reset pulse from a tracker. The comparators are set to trip in sequence at preselected values. If the component types and values suggested in the application are used, comparators 148–154 will trip in ascending order at 0.1 volt, 0.45 volt, 0.55 volt, and 0.9 volt.

Each comparator, when tripped, sets its corresponding flip flop. That is, when tripped comparator 148 sets flip flop 196; when tripped comparator 150 sets flip flop 198; when tripped comparator 152 sets flip flop 200; and, when tripped comparator 154 sets flip flop 202. The number of flip flops set control the rate and polarity of integration performed by integrator 214. The rates of integration are selected to provide critical, or over damped response by the control loop. In the example given, the range of feedback voltage is from −6.0 volts to 0.6 volts.

The digital Pulse Level Detection Comparators and Flip Flops operate as follows: When the pulse level at the input to comparators 148–154 is within the predetermined, controlled range, which is 0.45–0.55 volts at point B in the preferred embodiment example given, the comparators will not trip. If the pulse level at point B is greater than 0.55 volts the threshold of comparator 152 is exceeded and comparator 152 trips, setting flip-flop 200 which provides an output. The output of flip-flop 200 is integrated by integrator 214 to provide a ramp signal which causes the pulse level at point B and, consequently, the input to the comparators to be reduced at a prescribed rate. If the input level to the comparator crosses the second upper threshold, i.e., 0.9 volts at point B, comparator 154 additionally trips, setting flip-flop 202 which provides an output. The outputs of flip-flops 200 and 202 are integrated by integrator 214 to provide a ramp signal which causes the pulse level at point B and, consequently, the input to the comparators to be reduced at a prescribed rate, but one which is greater than the rate caused by flip-flop 200 acting alone. Likewise, if the input level crosses the first lower threshold, comparator 150 and flip-flop 198 causes the pulse level and comparators' input to be increased; and, if the second lower level is crossed the effect caused by comparator 148 and flip-flop 196 is added to comparator 150's and flip-flop 198's effect to increase the pulse level and comparators input at a correspondingly higher rate. As a result, the range within which the pulse level is maintained can be selected by choosing the levels at which the first upper, and first lower, threshold comparators trip; and, the rate at which the pulse level is driven toward the acceptable range can be controlled by predetermining the number of thresholds a particular input level will cross, and thereby, the number of comparators tripped.

The following list of component types and values if offered by way of example only of one operable embodiment of the present invention, which embodiment is described above.

| Symbol | Component | Type or Value |
|---|---|---|
| 10 | Capacitor | 80 μf, 15 volt, NP |
| 12 | Resistor | 680 |
| 14 | Shorted delay line | 0.25 μsec |
| 16 | Differential amplifier | CA3001 |
| 18 | Zener Diode | 1N753A |
| 20,22 | Capacitor | 0.01 μf |
| 24,26 | Capacitor | 4.7 μf, 10 volt |
| 28,30 | Diode | HP2800 |
| 32,34 | Resistor | 2K |
| 36 | Resistor | 3.9K |
| 38 | Capacitor | 330 pf |
| 40 | Resistor | 620 |
| 42 | Resistor | 3 M |
| 44 | Resistor | 3K |
| 46 | Diode | HP2800 |
| 48 | Capacitor | 27 pf |
| 50 | Resistor | 3.9K |
| 52 | Capacitor | 0.01 μf |
| 54 | Operational Amplifier | CA3031 |
| 56 | Capacitor | 56 pf |
| 58 | Capacitor | 0.01 μf |
| 60 | Resistor | 30.1 K |
| 62 | Capacitor | 0.1 μf |
| 64 | Resistor | 560K |
| 66 | Field Effect Transistor | 3N128 |
| 68 | Resistor | 1 M |
| 70 | Resistor | 1K |
| 72 | Capacitor | 120 pf |
| 74 | Resistor | 9.1K |
| 76 | Resistor | 180 |
| 78 | Comparator | μL710 |
| 80,82 | Capacitor | 0.01 μf |
| 84 | Resistor | 1K |
| 86 | Resistor | 1.5K |
| 88 | Transistor | 2N706 |
| 90 | Resistor | 18.2K |
| 92 | Resistor | 2K |
| 94 | Capacitor | 560 pf |
| 96 | Resistor | 360 |
| 98 | Resistor | 2K |
| 100 | Operational Amplifier | CA3031 |
| 102 | Capacitor | 0.1 μf |
| 104 | Capacitor | 56 pf |
| 106 | Capacitor | 0.01 μf |
| 108,110 | Resistor | 18K |
| 112 | Diode | HP2800 |
| 114 | Transistor | 2N7063 |
| 116 | Capacitor | 0.0022 μf |
| 118 | Resistor | 24.3 |
| 120 | Capacitor | 22 μf, 15 volt |
| 122 | Resistor | 2K |

| | | |
|---|---|---|
| 124 | Resistor | 750 |
| 126 | Resistor | 91.1 |
| 128 | Resistor | 24.3 |
| 130 | Resistor | 91.1 |
| 132,136, 140,144 | Resistor | 300 |
| 140, 144 | | |
| 134,138, 142,146 | Resistor | 100K |
| 148,150, 152,154 | ½ dual comparator | ½ MC1514 |
| 156,158, 160,162 | Capacitor | 0.01 μf |
| 164,168, 172,176 | Resistor | 6.2K |
| 166,170, 174,178 | Capacitor | 100 pf |
| 180,184, 188,192 | Transistor | 1/5 CA3045 |
| 182,186, 190,194 | Resistor | 3.9K |
| 196, 198, 200,202 | Flip Flop | ½ CD4013 |
| 204,210 | Resistor | 56K |
| 206,208 | Resistor | 510K |
| 212,216 | Capacitor | 150 μf, 15 volt |
| 214 | Amplifier | μA741 |
| 218 | Zener Diode | |
| 220 | Diode | 1N663 |
| $V_1$ | Supply Voltage | 12 volts |
| $V_2$ | Supply Voltage | 6 volts |

In the present invention the use of digital electronics in the AGC loop eliminates the use of linear components for long term stretching of short pulses. The digitally stretched pulses drive the AGC integrator and are responsible, at least in part, for the improved nature of the present invention. Voltage sag across the FET gate 66 interval is negligible. And, the AGC response is equal for pulse level changes in either direction.

We claim:

1. An electrical circuit for providing output pulses in response to input signals and controlling the level of the output pulses of the circuit, comprising:

means coupled to said input signals for converting changes in the input signal to electrical pulses;

means coupled to said converting means for passing only the electrically positive portions of said electrical pulses;

means coupled to said positive pulse passing means for combining a control signal and said positive pulses;

means coupled to said positive pulse passing means for passing only those signals which occur during a preselected period;

means coupled to said preselected period, pulse passing means for providing the circuit output, which output includes only those positive pulses occurring during the preselected period that have a maximum value greater than a preselected reference; and means coupled to said preselected period, pulse passing means for providing said control signal when the maximum value of the pulse passed by said preselected period, pulse passing means fails to fall within a preselected range, such that said control signal causes said maximum value of the pulse passed to return to said preselected range.

2. The circuit of claim 1 wherein said control signal providing means includes:

means for detecting the maximum value of the pulse passed by said preselected period, pulse passing means and providing an output when said detected maximum value fails to fall within said preselected range;

means coupled to said detecting and providing means for providing a pulse output in response to the output of said detecting and providing means; and means coupled to said pulse output providing means for converting the pulse output to a linear, increasing electrical signal, which increasing electrical signal is said control signal.

3. The circuit of claim 2 wherein said control signal providing means further includes a pulse stretcher coupling said preselected period, pulse passing means to said detecting and providing means for stretching the pulse passed by said preselected period, pulse passing means.

4. The circuit of claim 2 wherein:

said detecting and providing means is a plurality of digital comparators for comparing the maximum value of the pulse passed by said preselected period, pulse passing means to a reference; and said pulse output providing means is a plurality of flip-flops.

5. The circuit of claim 4 wherein each said comparator has a different reference value, and a respective flip-flop, associated therewith.

6. The circuit of claim 5 wherein each digital comparator provides an output when the maximum value of the pulse passed by said preselected period, pulse passing means excees the threshold value defined by its respective reference.

7. The circuit of claim 1 further comprising:

an amplifier coupling said converting means to said positive pulse passing means; and an amplifier coupling said positive pulse passing means to said preselected period, pulse passing means.

* * * * *